(12) United States Patent
Abe et al.

(10) Patent No.: US 7,690,341 B2
(45) Date of Patent: Apr. 6, 2010

(54) ENGINE INTAKE VALVE TIMING CONTROL APPARATUS

(75) Inventors: Hiroshi Abe, Isehara (JP); Takeshi Ohno, Yamato (JP); Masahiko Yuya, Yokohama (JP); Takatsugu Katayama, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 111 days.

(21) Appl. No.: 11/861,615

(22) Filed: Sep. 26, 2007

(65) Prior Publication Data

US 2008/0092835 A1 Apr. 24, 2008

(30) Foreign Application Priority Data

Oct. 24, 2006 (JP) ............................. 2006-288673

(51) Int. Cl.
*F01L 1/34* (2006.01)
(52) U.S. Cl. ............... 123/90.17; 123/90.15; 123/90.31
(58) Field of Classification Search ............. 123/90.15, 123/90.17, 90.31
See application file for complete search history.

(56) References Cited

U.S. PATENT DOCUMENTS 6,810,843 B2* 11/2004 Quinn, Jr. ................ 123/90.15

2002/0010540 A1* 1/2002 Moriya et al. ............... 701/115
2003/0217716 A1* 11/2003 Kusano et al. ............ 123/90.17

FOREIGN PATENT DOCUMENTS

| JP | H10-331612 | 12/1998 |
| JP | H10-331670 | 12/1998 |
| JP | 2002-349301 | 12/2002 |

* cited by examiner

*Primary Examiner*—Zelalem Eshete
(74) *Attorney, Agent, or Firm*—Global IP Counselors, LLP

(57) ABSTRACT

An engine intake valve timing control apparatus includes a fuel injection control section, a valve open timing control section, and a valve timing change rate setting section. The fuel injection control section is configured to control a fuel injection quantity of fuel injected from a fuel injector into an intake port of an engine in accordance with an operating condition of the engine. The valve open timing control section is configured to control an open timing of an intake valve to a target open timing. The valve timing change rate setting section sets a change rate at which the open timing of the intake valve is changed from a current open timing to the target open timing when the target open timing is updated, the change rate being set using a parameter relating to a vaporization rate of the fuel adhered to the intake port.

13 Claims, 11 Drawing Sheets

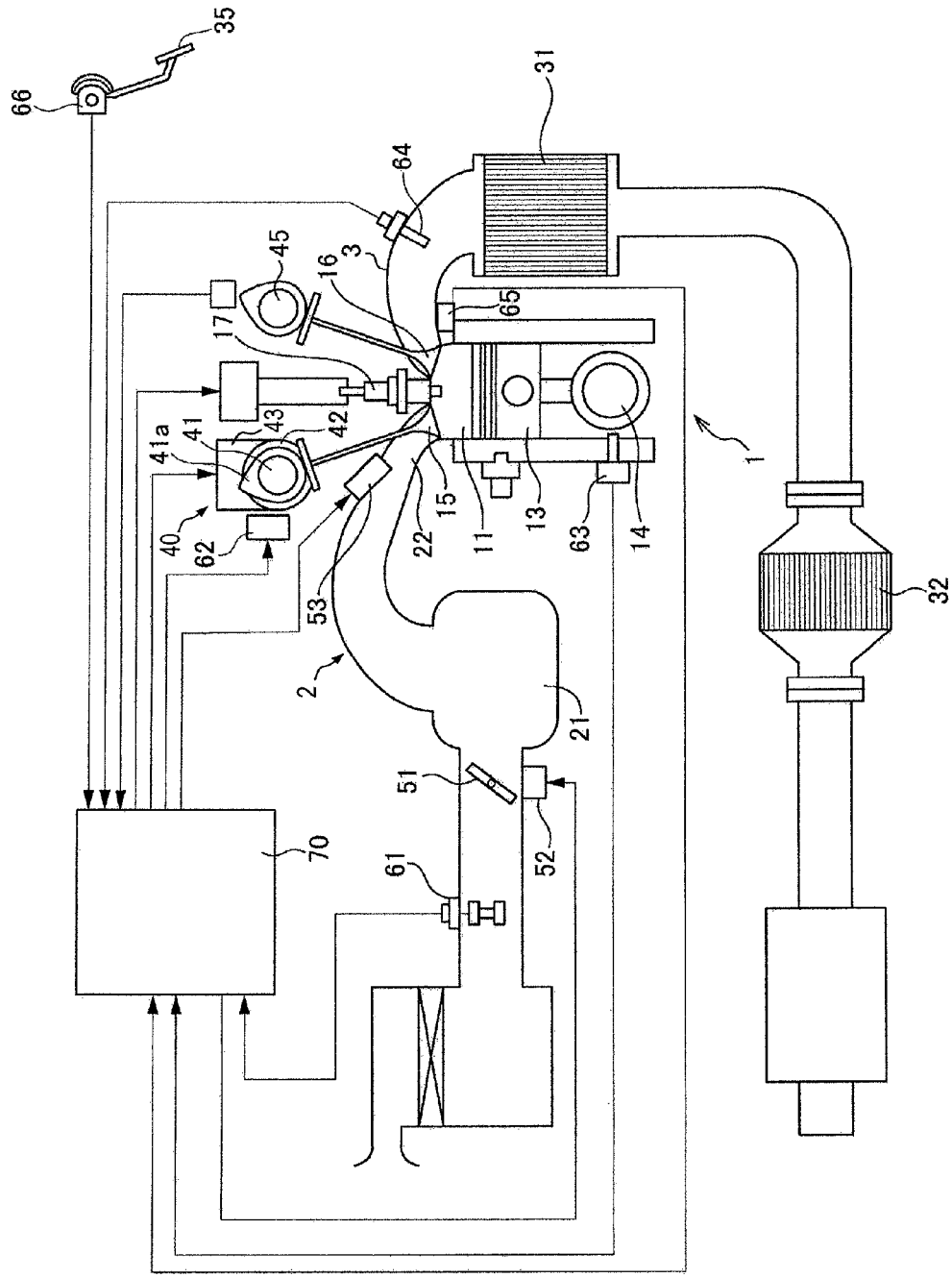
F I G. 1

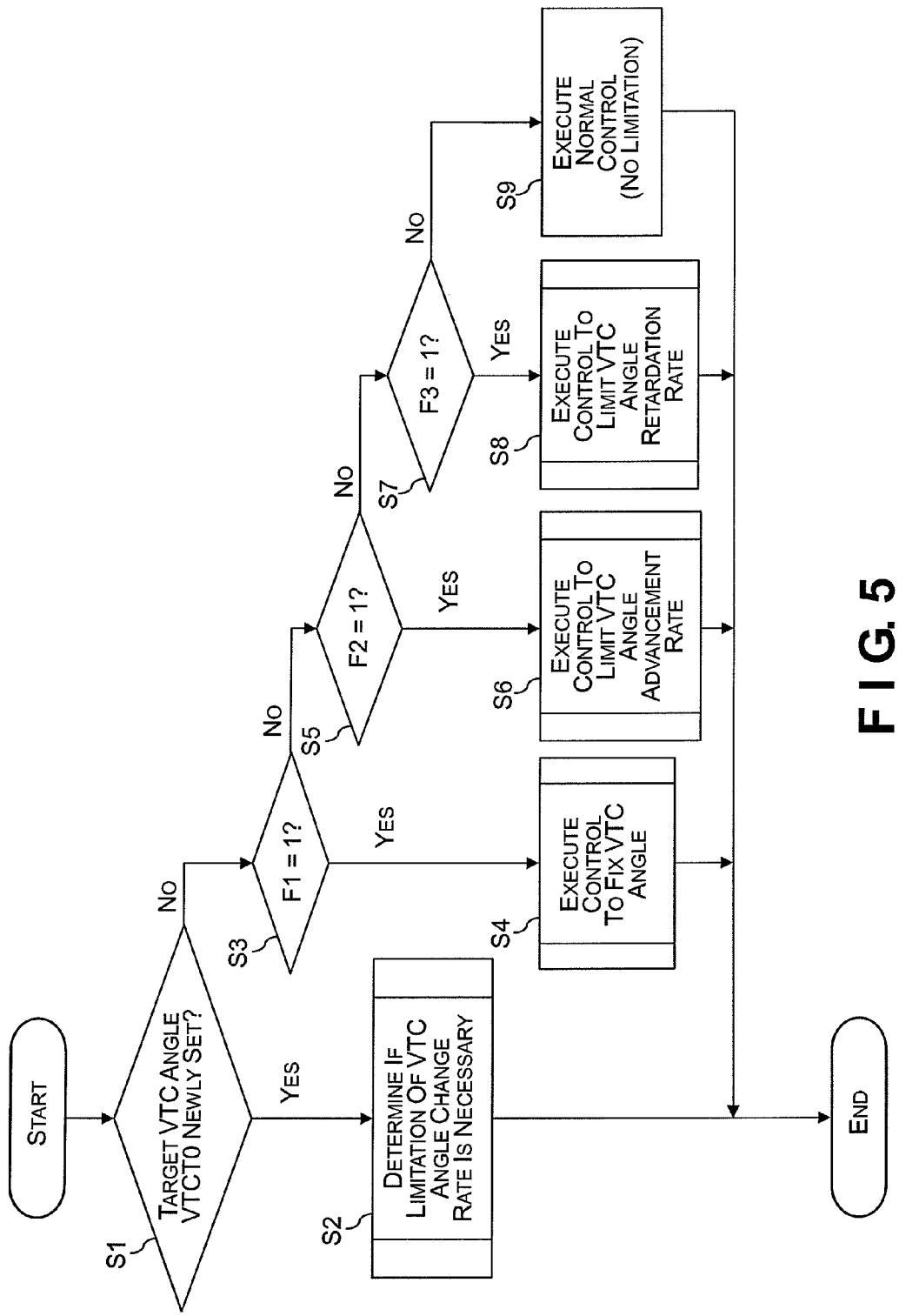
F I G. 5

US 7,690,341 B2

ENGINE INTAKE VALVE TIMING CONTROL APPARATUS

CROSS-REFERENCE TO RELATED APPLICATIONS

This application claims priority to Japanese Patent Application No. 2006-288673, filed on Oct. 24, 2006. The entire disclosure of Japanese Patent Application No. 2006-288673 is hereby incorporated herein by reference.

BACKGROUND OF THE INVENTION

1. Field of the Invention

The present invention relates to an engine valve timing control apparatus that controls the open timing of an intake valve of an engine.

2. Background Information

Japanese Laid-Open Patent Publication No. 2002-349301 discloses an example of known mechanisms for changing the open/close timing of an intake valve of an engine in order to achieve both good torque performance in low to medium vehicle speed regions and good output power in high vehicle speed regions. If the valve open/close timing is changed too abruptly, then it is possible that the engine will stall. The above mentioned reference addresses this issue by limiting the valve timing change rate at which the valve open/close timing is changed based on the engine speed and the direction in which the open/close timing is being changed (i.e., advanced or retarded).

In view of the above, it will be apparent to those skilled in the art from this disclosure that there exists a need for an improved engine intake valve timing control apparatus. This invention addresses this need in the art as well as other needs, which will become apparent to those skilled in the art from this disclosure.

SUMMARY OF THE INVENTION

It has been observed that even if the valve timing change rate is adjusted in accordance with the engine speed in the manner described in the above mentioned reference, the degree of ease with which fuel adhered to the intake port vaporizes varies depending on the operating state of the engine. Consequently, the amount of fuel drawn into the cylinder of the engine varies and the engine stalling can occur due to changes in the air fuel ratio of the air fuel mixture in the cylinder.

The present invention was conceived in view of this issue. One object of the present invention is to provide an engine intake valve timing control apparatus that can stabilize the combustion of an engine in accordance a vaporization rate of the fuel adhered to an intake port of the engine.

In order to achieve the above mentioned object, an engine intake valve timing control apparatus includes a fuel injection control section, a valve open timing control section, and a valve timing change rate setting section. The fuel injection control section is configured to control a fuel injection quantity of fuel injected from a fuel injector into an intake port of an engine in accordance with an operating condition of the engine. The valve open timing control section is configured to control an open timing of an intake valve to a target open timing. The valve timing change rate setting section sets a change rate at which the open timing of the intake valve is changed from a current open timing to the target open timing when the target open timing is updated, the change rate being set using a parameter relating to a vaporization rate of the fuel adhered to the intake port.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 1 is an overall schematic view of an internal combustion engine system provided with an engine intake valve timing control apparatus in accordance with one embodiment of the present invention;

FIG. 5 is a main flowchart for explaining the main control routine executed by the engine intake valve timing control apparatus in accordance with the illustrated embodiment of the present invention;

DETAILED DESCRIPTION OF THE PREFERRED EMBODIMENTS

Figure 2:
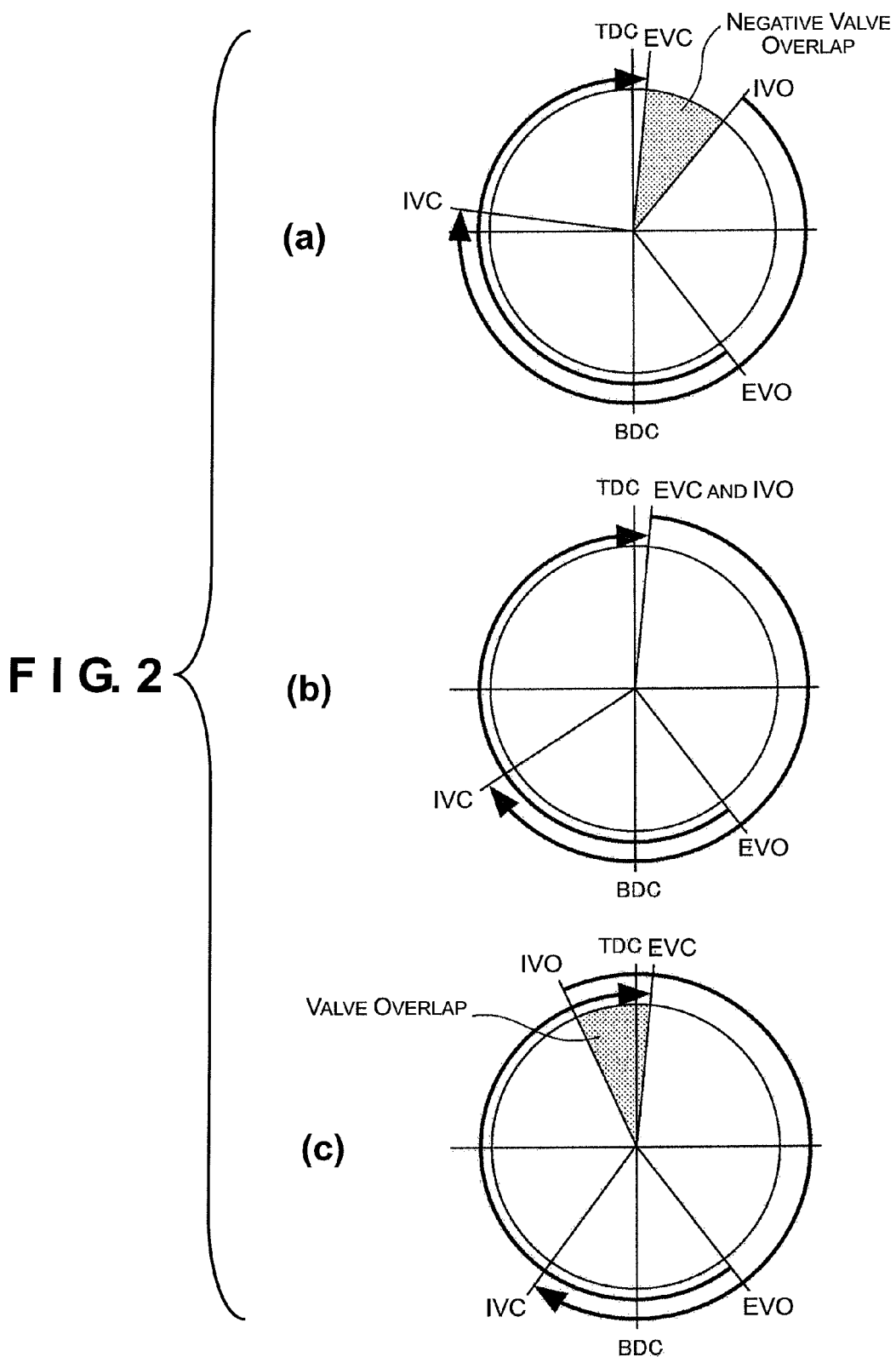
FIG. 2 is a series of valve timing diagrams (a) to (c) illustrating different valve open/close timings in accordance with the illustrated embodiment of the present invention.

Selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

FIG. 1 is an overall schematic view of an internal combustion system having an engine intake valve timing control apparatus in accordance with one embodiment of the present invention.

As shown in FIG. 1, the internal combustion engine system includes an engine 1 including a plurality of cylinders 11 each having a piston 13 coupled to a crankshaft 14. Moreover, each of the cylinders 11 is fluidly coupled to an intake passage 2 with at least one intake valve 15 being interposed therebetween, and to an exhaust passage 3 with at least one exhaust valve 15 being interposed therebetween. More specifically, the intake valve 15 is disposed in an intake port 22 of the intake passage 2. In the illustrated embodiment, the intake valve 15 is coupled to an intake valve camshaft 41 that is controlled by a variable valve timing control mechanism 40 (hereinafter "the VTC mechanism") as explained in more detail below. The exhaust valve 16 is coupled to an exhaust valve camshaft 45. Each of the cylinders 11 is further provided with a spark plug 17. The internal combustion engine system further includes a controller 70 that is configured to control an operation of the engine 1 based on various operating parameters such as a depression amount of an accelerator pedal 35.

The intake passage 2 of the engine 1 further includes an intake collector 21. As shown in FIG. 1, an intake throttle 51 is provided upstream of the intake collector 21 and a fuel injector 53 is provided downstream of the intake collector 21. The intake throttle 51 is driven by a throttle motor 52. In other words, in the illustrated embodiment, the intake throttle 51 is not mechanically connected to the accelerator pedal 35. The fuel injector 53 is configured and arranged to inject fuel into the intake port 22.

As shown in FIG. 1, a manifold catalytic converter 31 and an underfloor catalytic converter 32 are provided in the exhaust passage 3. The manifold catalytic converter 31 and the underfloor catalytic converter 32 are preferably three-way catalytic converters that are configured and arranged to remove hydrocarbons (HC), carbon monoxide (CO), and nitrogen oxides (NOx) from exhaust gas when the air fuel ratio of the exhaust gas is in a narrow range (or "window") centered on the stoichiometric air fuel ratio.

The VTC mechanism 40 is configured and arranged to control the open/close timing of the intake valve 15 of the engine 1. The VTC mechanism 40 is a conventional component that is well known in the art. Since the VTC mechanism 40 is well known in the art, these structures will be explained only briefly herein. Rather, it will be apparent to those skilled in the art from this disclosure that the components can be any type of structure and/or programming that can be used to carry out the present invention.

More specifically, the VTC mechanism 40 is a valve open timing control mechanism having the intake valve camshaft 41, a cam sprocket 42 and a hydraulic pressure control mechanism 43. The intake valve camshaft 41 is integrally formed with a cam 41a that serves to open and close the intake valve 15. The cam sprocket 42 is fitted onto a tip end of the intake valve camshaft 41 such that the cam sprocket 42 can rotate relative to the intake valve camshaft 41. The cam sprocket 42 rotates relative to the intake valve camshaft 41 in response to hydraulic pressure that is regulated by the hydraulic pressure control mechanism 43. The cam sprocket 42 rotates in synchronization with the crankshaft 14. With this structure, the cam sprocket 42 can be moved rotationally with respect to the intake valve camshaft 41 such that the open/close timing of the intake valve 15 can be changed with respect to the engine rotation (rotation of the crankshaft 14). In this description of the illustrated embodiment, the crank angle at the opening timing of the intake valve 15 will be called a VTC angle.

The exhaust valve 16 of the engine 1 is arranged to be opened and closed with the exhaust valve camshaft 45. More specifically, in the illustrated embodiment, the exhaust valve 16 is arranged to be opened and closed at a fixed timing with respect to the engine rotation (rotation of the crankshaft 14).

The internal combustion system as illustrated in FIG. 1 further has various sensors including an air flow meter 61, a VTC angle sensor 62, a crank angle sensor 63, an oxygen ($O_2$) sensor 64, a coolant temperature sensor 65, and an accelerator position sensor 66. The air flow meter 61 is configured and arranged to detect the intake air flow rate, and to send an output signal indicative of the detected intake air flow rate to the controller 70. The VTC angle sensor 62 is configured and arranged to detect the VTC angle, and to send an output signal indicative of the detected VTC angle to the controller 70. The crank angle sensor 63 is configured and arranged to detect the rotational speed of the engine 1, and to send an output signal indicative of the detected rotational speed of the engine 1 to the controller 70. The oxygen sensor 64 is configured and arranged to detect the oxygen amount contained in the exhaust gas, and to send an output signal indicative of the detected oxygen amount contained in the exhaust gas to the controller 70. The coolant temperature sensor 65 is configured and arranged to detect the temperature of the engine coolant, and to send an output signal indicative of the detected temperature of the engine coolant to the controller 70. The accelerator position sensor 66 is configured and arranged to detect the depression amount of the accelerator pedal 35, and to send an output signal indicative of the detected depression amount of the accelerator pedal 35 to the controller 70.

The controller 70 is configured to control the fuel injector 53, the spark plug 17, the intake throttle 51 (the throttle motor 52), and the VTC mechanism 40 based on the detection signals received from the sensors mentioned above.

More specifically, the controller 70 preferably includes a microcomputer comprising a central processing unit (CPU) with an intake valve timing control program that controls the open/close timing of the intake valve 15 as discussed below. The controller 70 can also include other conventional components such as an input/output interface circuit (I/O interface), and storage devices such as a ROM (Read Only Memory) device and a RAM (Random Access Memory) device. The microcomputer of the controller 70 is programmed to control the various components of the engine 1. The memory circuit stores processing results and control programs that are run by the processor circuit. The controller 70 is operatively coupled to the various components of the engine 1 in a conventional manner. The internal RAM of the controller 70 stores statuses of operational flags and various control data. The internal ROM of the controller 70 stores the preset maps and data used for various operations. The controller 70 is capable of selectively controlling any of the components of the control system in accordance with the control program. It will be apparent to those skilled in the art from this disclosure that the precise structure and algorithms for the controller 70 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. It is also acceptable for the controller 70 to be made up of a plurality of microcomputers.

The controller 70 preferably constitutes the engine intake valve timing control apparatus including the fuel injection control section, the valve open timing control section and the valve timing change rate section in accordance with the illustrated embodiment of the present invention.

FIG. 2 is a series of valve timing diagrams (a) to (c) illustrating different open/close timings of the intake valve 15 in accordance with the illustrated embodiment of the present invention. By using the VTC mechanism 40, the open/close timing of the intake valve 15 can be changed as shown in the diagrams (a) to (c) of FIG. 2.

The diagram (a) of FIG. 2 shows a case in which the VTC angle (i.e., the crank angle at the intake valve open timing) is retarded to the greatest degree possible (most retarded open timing). In the case shown in the diagram (a) of FIG. 2, the intake valve 15 opens at the intake valve open timing (IVO) occurring when the crankshaft 14 has rotated through a prescribed crank angle after the exhaust valve close timing (EVC) at which the exhaust valve 15 closes. Thus, there is a period in the vicinity of top dead center (TDC) of the exhaust stroke during which both the intake valve 15 and the exhaust valve 16 are closed. This valve timing state is called a negative valve overlap state.

On the other hand, the diagram (c) of FIG. 2 shows a case in which the VTC angle is advanced to the greatest degree possible (most advanced open timing). In this case, the exhaust valve 16 closes at the exhaust valve close timing (EVC) occurring when the crankshaft 14 has rotated through a prescribed crank angle after the intake valve open timing (IVO) at which the intake valve 15 opens. Thus, there is a period in the vicinity of top dead center (TDC) of the exhaust stroke during which both the intake valve 15 and the exhaust valve 16 are open. This valve timing state is called a valve overlap state.

By adjusting the VTC angle between the most retarded open timing (diagram (a)) and the most advanced open timing (diagram (c)), it is also possible to achieve the state shown in the diagram (b) of FIG. 2, in which the intake valve open timing (IVO) is the same as the exhaust valve close timing (EVC).

It has been observed that, in an engine, which is configured such that the open/close timing of the intake valve can be changed using a VTC mechanism or the like, even if the intake air quantity and the fuel injection quantity are fixed (constant), the air fuel ratio changes when the open/close timing of the intake valve is changed. If the rate at which the air fuel ratio changes is slow, then the desired air fuel ratio can be obtained using a feedback revision control scheme. However, if the rate at which the air fuel ratio changes is too fast, a feedback revision control scheme will not be able to maintain the desired air fuel ratio. Therefore, under a prescribed operating condition, control is executed to prevent the change rate of the air fuel ratio from becoming too fast.

Accordingly, in the illustrated embodiment of the present invention, it has been observed that fuel adhered to the inside wall of the intake port 22 is a cause of changes in the air fuel ratio. In other words, when the VTC angle is in the most retarded state (state shown in the diagram (a) of FIG. 2), the intake valve 15 opens after the exhaust valve 16 closes in the vicinity of top dead center after the piston 13 has started descending. As the VTC angle becomes more advanced, the descent amount of the piston 13 at the time when the intake valve 15 opens becomes smaller. When the VTC angle is in the most advanced state shown in the diagram (c) of FIG. 2, the intake valve 15 opens while the piston 13 is still rising toward top dead center (TDC) and the exhaust valve 16 closes after the intake valve 15 opens.

The internal pressure that occurs inside the cylinder 11 when the intake valve 15 is opened is the lowest when the state shown in the diagram (a) of FIG. 2 (most retarded state) exists. Thus, in such case, the fuel adhered to the inside wall of the intake port 22 is more readily drawn into the cylinder 11. In other words, fuel adhered to the inside wall of the intake port 22 vaporizes more easily in the state shown in the diagram (a) of FIG. 2. On the other hand, the more the VTC angle is advanced, the higher the pressure inside the cylinder 11 when the intake valve 15 is opened becomes and the more difficult it is for fuel adhered to the inside wall of the intake port 22 to be drawn into the cylinder 11. In other words, fuel adhered to the inside wall of the intake port 22 vaporizes less easily in the state shown in the diagram (c) of FIG. 2. Thus, the air fuel ratio of the air fuel mixture drawn into the cylinder 11 changes when the VTC angle changes even if the quantity of fuel injected from the fuel injector 53 is constant. Accordingly, the negative pressure developed in the intake port 22 varies by changing the open timing of the intake valve 15, and thus, a rate at which an amount of the adhered fuel that vaporizes (equilibrium vapor pressure) from the intake port 22 changes according to a change amount of the open timing of the intake valve 15. Therefore, the change amount of the open timing of the intake valve 15 is one example of a parameter relating to the vaporization rate of the fuel adhered to the intake port 22 in accordance with the illustrated embodiment of the present invention.

Figure 3:
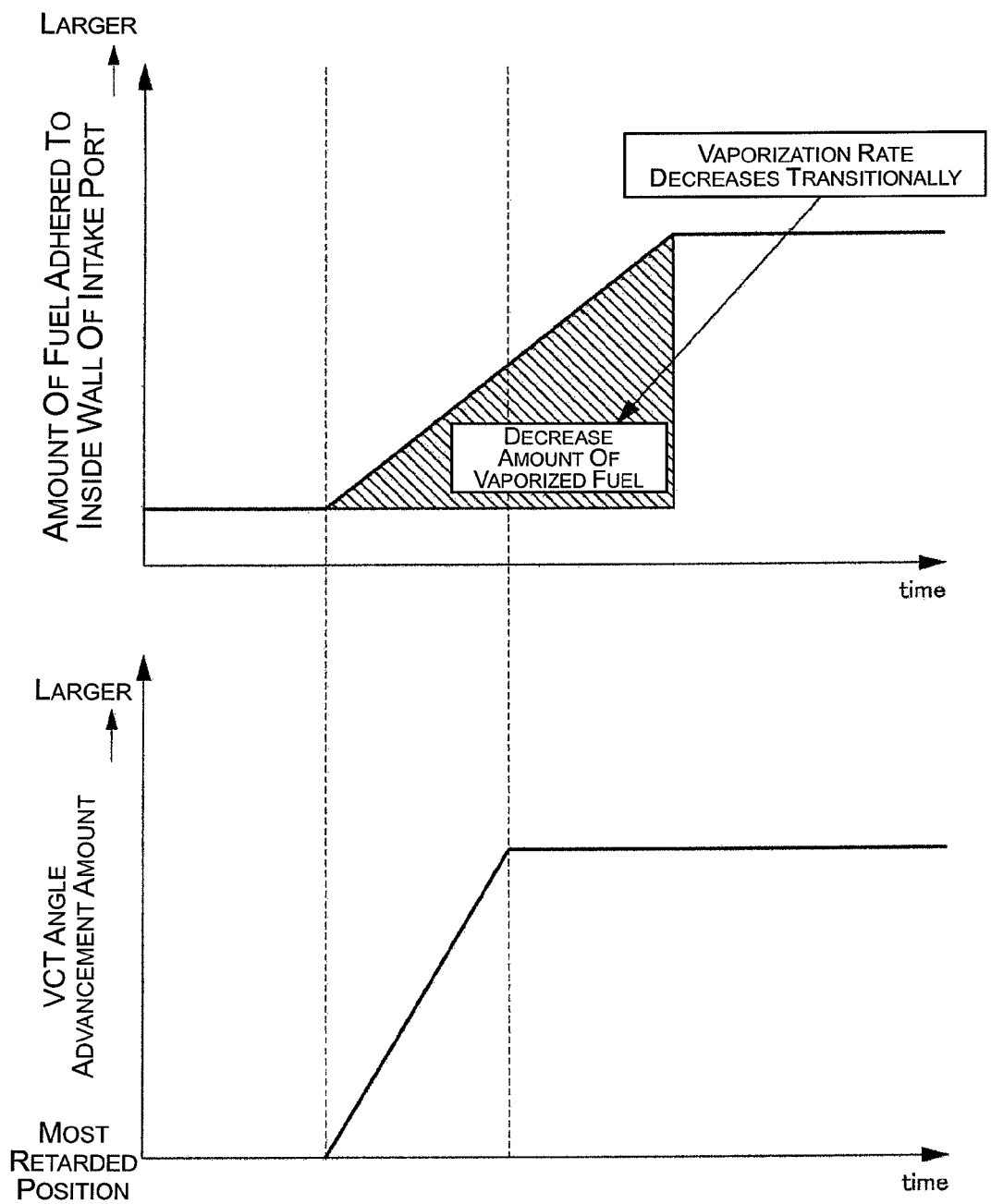
FIG. 3 is a schematic diagram illustrating how an amount of fuel adhered to an inside wall of an intake port changes when an intake valve open timing is advanced from a most retarded timing by a prescribed angle in accordance with the illustrated embodiment of the present invention.

FIG. 3 is a schematic diagram illustrating the relationship between the VTC angle and the adhered fuel that is adhered to the inside wall of the intake port 22. FIG. 3 shows how the amount of fuel adhered to the inside wall of the intake port 22 changes when the VTC mechanism 40 advances the VTC angle (i.e., the intake valve open timing (IVO)) from the most retarded position by a prescribed angle.

When the VTC mechanism 40 advances the VTC angle from the most retarded position, even if the fuel injection quantity is fixed, the amount of fuel adhered to the inside wall of the intake port 22 increases as shown in the top portion of FIG. 3. Therefore, the amount of fuel drawn into the cylinder 11 decreases. In other words, the amount of vaporized fuel decreases. Therefore, the air fuel ratio becomes leaner.

Figure 4:
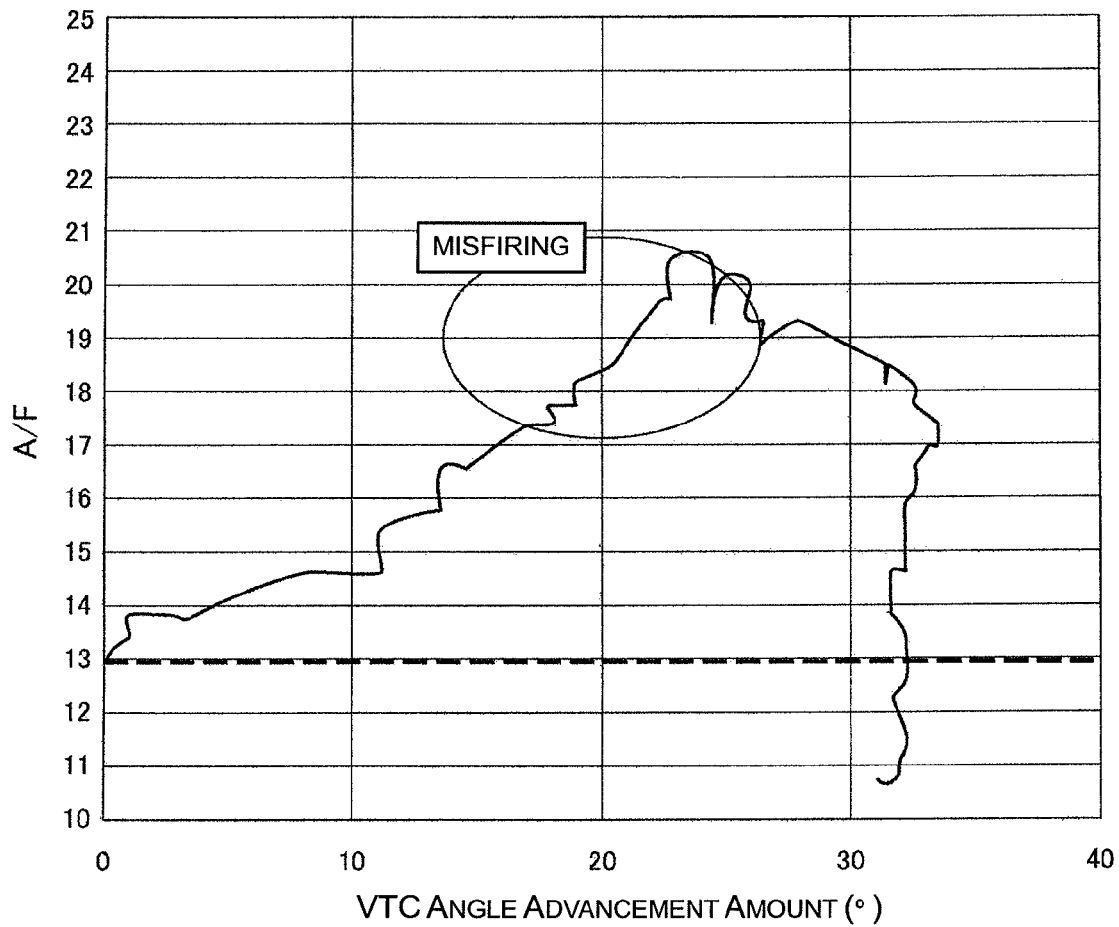
FIG. 4 is a schematic diagram illustrating a relationship of the air fuel ratio of the air fuel mixture drawn into a cylinder of the engine with respect to a VTC angle advancement amount in accordance with the illustrated embodiment of the present invention.

FIG. 4 is a schematic diagram showing the relationship between the VTC angle advancement amount and the air fuel ratio of the air fuel mixture drawn into the cylinder 11. The horizontal axis indicates the amount of angular advancement of the VTC angle from the most retarded state (state shown in the diagram (a) FIG. 2), and the vertical axis indicates the air fuel ratio A/F of the air fuel mixture drawn into the cylinder 11.

As shown in FIG. 4, the air fuel ratio A/F increases as the VTC angle advancement amount (an advancement amount from the most retarded state shown in the diagram (a) of FIG. 2) increases. When the VTC angle advancement amount exceeds approximately 16 degrees, the air fuel ratio surpasses a value 17 and the combustion becomes unstable, thus incurring the possibility of misfiring.

In view of the relationship described above, the controller 70 of the illustrated embodiment of the present invention is configured to determine if it is necessary to limit (control) the rate of change of the VTC angle based on whether fuel adhered to the intake port 22 vaporizes readily (easily) or not. When a condition is such that fuel adhered to the intake port 22 does not vaporize readily, changing the VTC angle has a large effect on the air fuel ratio, i.e., the air fuel ratio changes by a large amount in response to a change in the VTC angle. Under such conditions, the controller 70 is configured to set the rate at which the VTC angle is changed to a slower rate. In this way, the air fuel ratio is prevented from changing abruptly and the combustion of the engine 1 is stabilized.

The control executed by the controller 70 in order to limit the change rate of the VTC angle in accordance with the illustrated embodiment will now be explained in more detail.

FIG. 5 is a main flowchart for explaining the main control routine executed by the controller 70 in accordance with the illustrated embodiment of the present invention. The controller 70 is configured to repeatedly execute the control processing shown in FIG. 5 once per prescribed cycle time (e.g., once every 10 milliseconds).

In step S1, the controller 70 is configured to determine if a target VTC angle VTCT0 (target open timing) has been newly set (updated). The target VTC angle VTCT0 is often newly set when the engine 1 is started (i.e., started by turning the key on or restarted from an idle stop state). However, there are other times when the target VTC angle VTCT0 is newly set. The target VTC angle VTCT0 is determined by referring to a preset map based on an engine speed (e.g., a target idle speed) and the engine coolant temperature. If the controller 70 determines that the target VTC angle VTCT0 has been newly set, then the controller 70 proceeds to step S2. Otherwise, the controller 70 proceeds to step S3.

In step S2, the controller 70 is configured to determine if it is necessary to limit the change rate of the VTC angle. The details of this determination executed in step S2 will be explained later with reference to FIG. 6.

In step S3, the controller 70 is configured to determine if the value of a VTC angle fixing flag F1 is set to 1 (F1=1). The default value of the VTC angle fixing flag F1 is 0. If the value of the VTC angle fixing flag F1 is 1, then the controller 70 proceeds to step S4. Otherwise, the controller 70 proceeds to step S5.

In step S4, the controller 70 is configured to execute a control to fix the VTC angle. The details of the control executed in step S4 to fix the VTC angle will be explained later with reference to FIG. 7.

In step S5, the controller 70 is configured to determine if the value of a VTC angle advancement rate limiting flag F2 is set to 1 (F2=1). The default value of the VTC angle advancement rate limiting flag F2 is 0. If the value of the VTC angle advancement rate limiting flag F2 is 1, then the controller 70 proceeds to step S6. Otherwise, the controller 70 proceeds to step S7.

In step S6, the controller 70 is configured to execute a control to limit the advancement rate of the VTC angle. The details of the control executed in step S6 to limit the VTC angle advancement rate will be explained later with reference to FIG. 8A.

In step S7, the controller 70 is configured to determine if the value of a VTC angle retardation rate limiting flag F3 is set to 1 (F3=1). The default value of the VTC angle retardation rate limiting flag F3 is 0. If the value of the VTC angle retardation rate limiting flag F3 is 1, then the controller 70 proceeds to step S8. Otherwise, the controller 70 proceeds to step S9.

In step S8, the controller 70 is configured to execute a control to limit the retardation rate of the VTC angle. The details of the control executed in step S8 to limit the VTC angle retardation rate will be explained later with reference to FIG. 8B.

In step S9, the controller 70 is configured to execute a normal control without limiting the change rate of the VTC angle.

Figure 6:
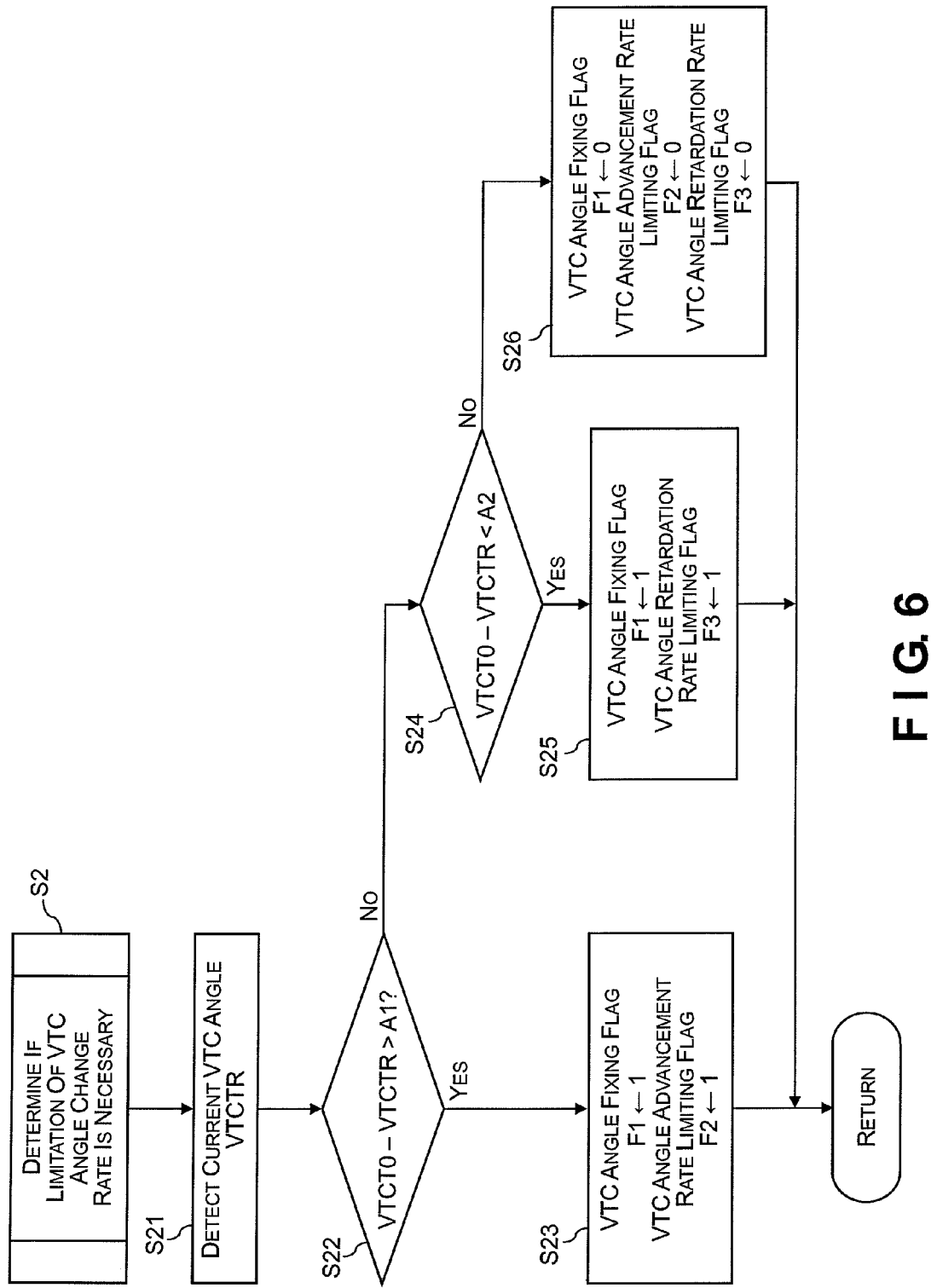
FIG. 6 is a flowchart for explaining a control subroutine executed in step S2 of FIG. 5 by the engine intake valve timing control apparatus in order to determine if it is necessary to limit the change rate of the VTC angle in accordance with the illustrated embodiment of the present invention.

FIG. 6 is a flowchart for explaining a control subroutine executed in step S2 of the main routine illustrated in FIG. 5 in order to determine if it is necessary to limit the change rate of the VTC angle.

In step S21, the controller 70 is configured to detect the current VTC angle VTCTR (current open timing).

In step S22, the controller 70 is configured to determine if the difference between the target VTC angle VTCT0 and the current VTC angle VTCTR (i.e., VTCT0-VTCTR) is larger than a threshold value A1. The difference VTCT0-VTCTR increases in the direction of advancement. In other words, the larger the difference VTCT0-VTCTR is, the greater the amount by which the target VTC angle VTCT0 is advanced with respect to the current VTC angle VTCTR. When the difference VTCT0-VTCTR is larger than the threshold value A1, the amount by which the target VTC angle VTCT0 is separated from the current VTC angle VTCTR in the advancement direction is large. The threshold value A1 used in step S22 is determined by, for example, referring to a preset map based on such engine operating conditions as the engine coolant temperature. If the difference VTCT0-VTCTR is larger than the threshold value A1, then the controller 70 proceeds to step S23. Otherwise, the controller 70 proceeds to step S24.

In step S23, the controller 70 is configured to set the values of the VTC angle fixing flag F1 and the VTC angle advancement rate limiting flag F2 to 1.

In step S24, the controller 70 is configured to determine if the difference between the target VTC angle VTCT0 and the current VTC angle VTCTR (i.e., VTCT0-VTCTR) is smaller than a threshold value A2 (negative value). The difference VTCT0-VTCTR increases in the advancement direction and decreases in the retardation direction. In other words, the smaller the difference VTCT0-VTCTR is, the greater the amount by which the target VTC angle VTCT0 is retarded with respect to the current VTC angle VTCTR. When the difference VTCT0-VTCTR is smaller than the threshold value A2, the amount by which the target VTC angle VTCT0 is separated from the current VTC angle VTCTR in the retardation direction is large. The threshold value A2 is determined by, for example, referring to a preset map based on the engine coolant temperature or other engine operating condition. If the difference VTCT0-VTCTR is smaller than the threshold value A2, then the controller 70 proceeds to step S25. Otherwise, the controller 70 proceeds to step S26.

In step S25, the controller 70 is configured to set the values of the VTC angle fixing flag F1 and the VTC angle retardation rate limiting flag F3 to 1.

In step S26, the controller 70 is configured to set the values of the VTC angle fixing flag F1, the VTC angle advancement rate limiting flag F2, and the VTC angle retardation rate limiting flag F3 to 0 (zero).

Figure 7:
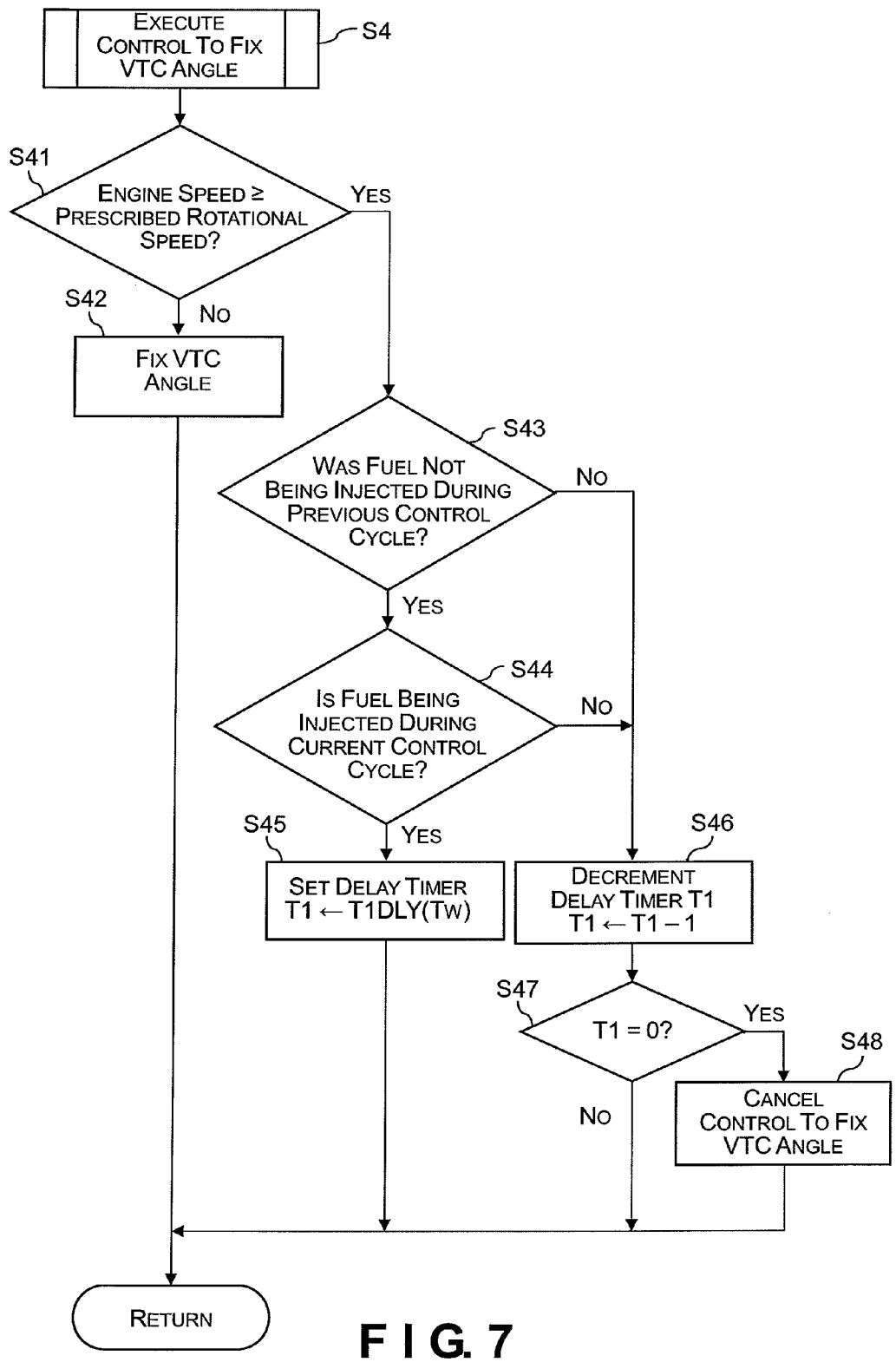
FIG. 7 is a flowchart for explaining a control subroutine executed in step S4 of FIG. 5 by the engine intake valve timing control apparatus in order to fix the VTC angle in accordance with the illustrated embodiment of the present invention.

FIG. 7 is a flowchart for explaining a control subroutine executed in step S4 of the main routine shown in FIG. 5 in order to fix the VTC angle.

In step S41, the controller 70 is configured to determine if the engine speed is equal to or higher than a prescribed rotational speed. The prescribed rotational speed is a speed that serves to determine if fuel injection can be executed when the engine 1 is being started. The prescribed speed is determined by referring to a preset map based on the engine coolant temperature or other engine operating condition. If the engine rotational speed has not reached the prescribed rotational speed, then the controller 70 proceeds to step S42. Otherwise, the controller 70 proceeds to step S43.

In step S42, the controller 70 is configured to fix the VTC angle at the current VTC angle so that the VTC angle is not changed.

In steps S43 and S44, the controller 70 is configured to determine if the current control cycle corresponds to the fuel injection start timing. More specifically, in step S43, the controller 70 is configured to determine if the fuel was not being injected during previous control cycle. In step S44, the controller 70 is configured to determine if the fuel is being injected during the current control cycle. If the current control cycle corresponds to the fuel injection start timing (i.e., Yes in both steps S43 and S44), then the controller 70 proceeds to step S45. If fuel was already being injected in the previous cycle (No in step S43) or if fuel injection is stopped in the current cycle (No in step S44), then the controller 70 proceeds to step S46.

Figure 9:
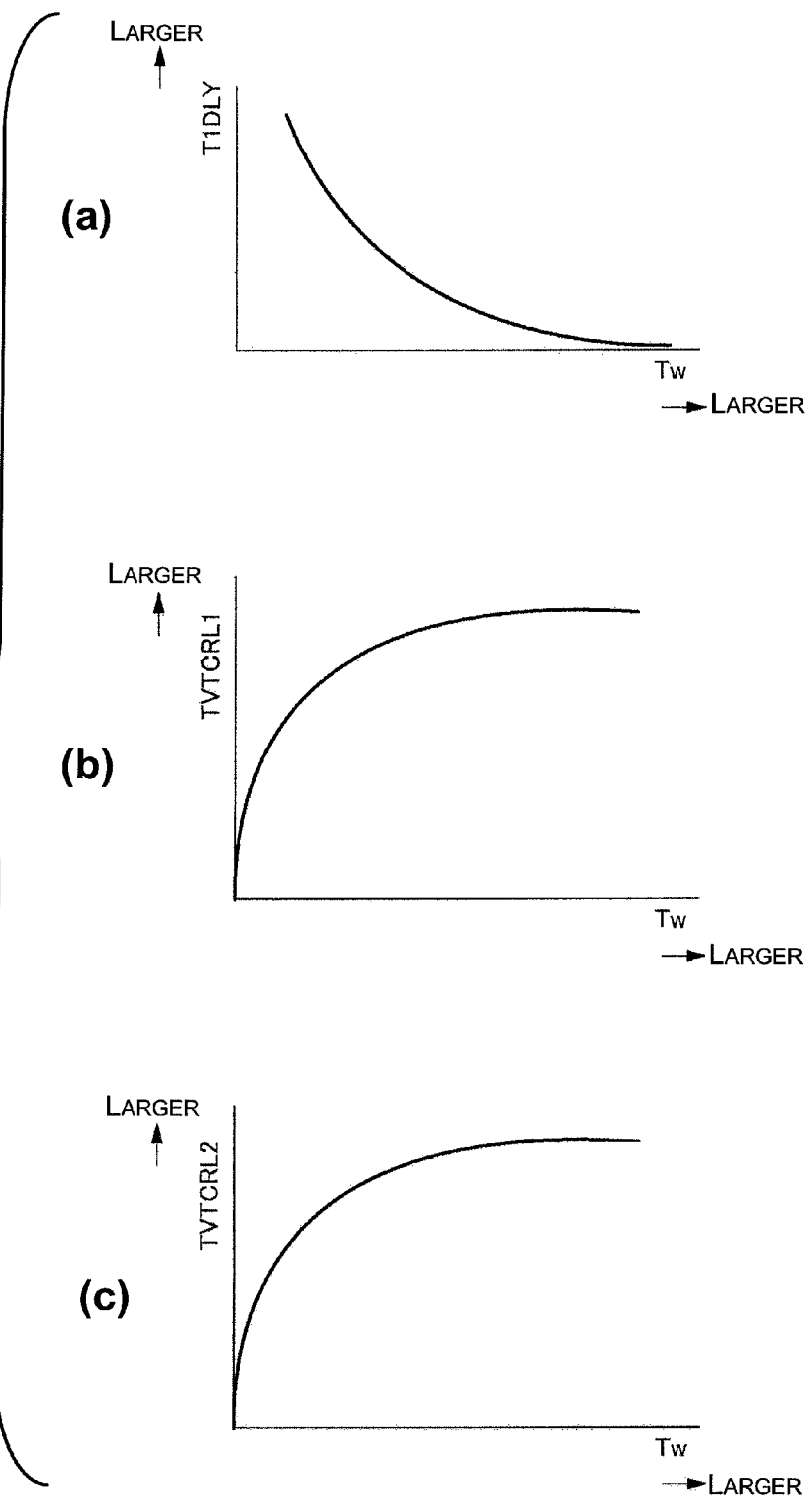
FIG. 9 includes several characteristic maps (a) to (c) showing examples of characteristic of the delay time (diagram(a)), the VTC angle advancement rate limit (diagram (b)), and the VTC angle retardation rate limit (diagram (c)) versus the engine coolant temperature in accordance with the illustrated embodiment of the present invention.

In step S45, the controller 70 is configured to set a value of a delay timer T1 to a delay time T1DLY. More specifically, the delay time T1DLY is determined based on the engine coolant temperature by referring to a characteristic map such as one shown in a diagram (a) of FIG. 9. The map shown in the diagram (a) of FIG. 9 is established in advance based on experimental data and stored in the ROM of the controller 70. As shown in the diagram (a) of FIG. 9, the delay time T1 DLY is set such that the lower the coolant temperature Tw is, the larger that value to which the delay time T1DLY is set. The engine coolant temperature Tw is one example of the parameter relating to the vaporization rate of the fuel adhered to the intake port 22 in accordance with the illustrated embodiment of the present invention.

In step S46, the controller 70 is configured to decrement the delay timer T1.

In step S47, the controller 70 is configured to determine if the value of the delay timer T1 is 0. While the value of the delay timer T1 is not 0, the controller 70 ends the subroutine and returns to the main routine shown in FIG. 5. When the value of the delay timer T1 reaches 0, the controller 70 proceeds to step S48.

In step S48, the controller 70 is configured to set the value of the VTC angle fixing flag F1 to 0 and to release (cancel) the fixed state of the VTC angle.

Figures 8A, 8B:
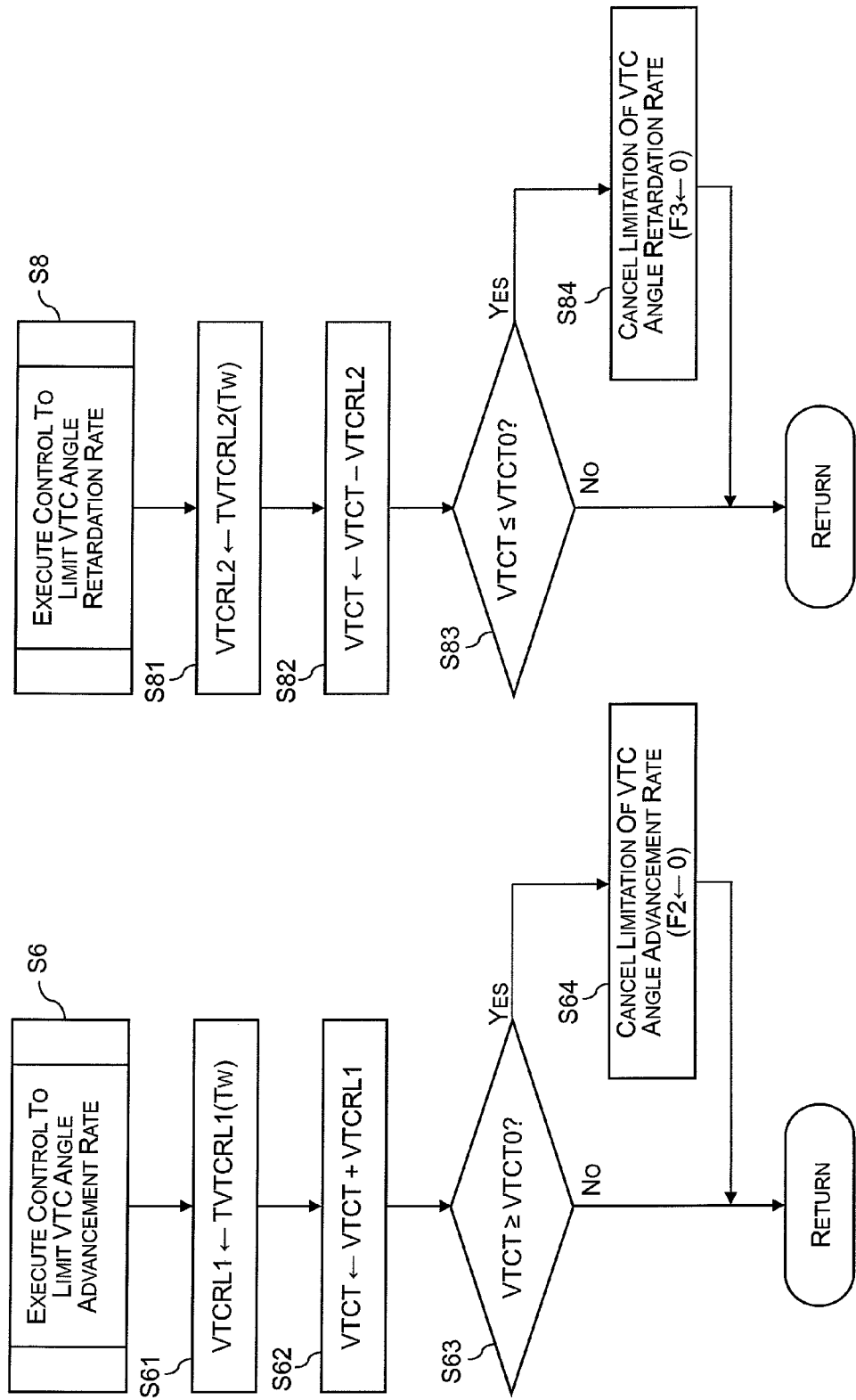
FIG. 8A is a flowchart for explaining a control subroutine executed in step S6 of FIG. 5 by the engine intake valve timing control apparatus in order to limit the advancement rate of the VTC angle in accordance with the illustrated embodiment of the present invention.
FIG. 8B is a flowchart for explaining a control subroutine executed in step S8 of FIG. 5 by the engine intake valve timing control apparatus in order to limit the retardation rate of the VTC angle in accordance with the illustrated embodiment of the present invention.

FIG. 8A is a flowchart for explaining a control subroutine executed in step S6 shown in FIG. 5 in order to limit the advancement rate of the VTC angle.

In step S61, the controller 70 is configured to determine a VTC angle advancement rate limit TVTCRL1 (change rate limit value). More specifically, the VTC angle advancement rate limit TVTCRL1 is determined based on the engine coolant temperature Tw by referring to a characteristic map such as one shown in the diagram (b) of FIG. 9. The map shown in the diagram (b) of FIG. 9 is established in advance based on experimental data and stored in the ROM of the controller 70. The VTC angle advancement rate limit TVTCRL1 is set such that the lower the coolant temperature Tw is, the smaller the value to which the VTC angle advancement rate limit TVTCRL1 becomes as shown in the diagram (b) of FIG. 9.

In step S62, the controller 70 is configured to change (update) a VTC control angle VTCT by adding the VTC angle advancement rate limit TVTCRL1 obtained in step S61 to the current VTC control angle VTCT.

In step S63, the controller 70 is configured to determine if the VTC control angle VTCT has reached the target VTC angle VTCT0. If the VTC control angle VTCT is not equal to or greater than the target VTC angle VTCT0 (No in step S63), then the controller 70 ends the subroutine shown in FIG. 8A and returns to the main routine shown in FIG. 5. On the other hand, if the VTC control angle VTCT is equal to or greater than the target VTC angle VTCT0 (Yes in step S63), then the controller 70 proceeds to step S64.

In step S64, the controller 70 is configured to set the value of the VTC angle advancement rate limiting flag F2 to 0 to cancel the VTC angle advancement rate limitation.

FIG. 8B is a flowchart for explaining a control subroutine executed in step S8 shown in FIG. 5 in order to limit the retardation rate of the VTC angle.

In step S81, the controller 70 is configured to determine a VTC angle retardation rate limit TVTCRL2 (change rate limit value). More specifically, the VTC angle retardation rate limit TVTCRL2 is determined based on the engine coolant temperature Tw by referring to a characteristic map such as one shown in the diagram (c) of FIG. 9. The map is established in advance based on experimental data and stored in the ROM of the controller 70. The VTC angle retardation rate limit TVTCRL2 is set such that the lower the coolant temperature Tw is, the smaller the value to which the VTC angle retardation rate limit TVTCRL2 becomes as shown in the diagram (c) of FIG. 9.

In step S82, the controller 70 is configured to change the VTC control angle VTCT by subtracting the VTC angle retardation rate limit TVTCRL2 obtained in step S81 from the current VTC control angle VTCT.

In step S83 the controller 70 is configured to determine if the VTC control angle VTCT has reached the target VTC angle VTCT0. If the VTC control angle VTCT is not equal to or smaller than the target VTC angle VTCT0 (No in step S83), then the controller 70 ends the subroutine and returns to the main routine shown in FIG. 5. If the VTC control angle VTCT is equal to or smaller than the target VTC angle VTCT0 (Yes in step S83), then the controller 70 proceeds to step S84.

In step S84, the controller 70 is configured to set the value of the VTC angle retardation rate limiting flag F3 to 0 to cancel the VTC angle retardation rate limitation.

Figure 10:
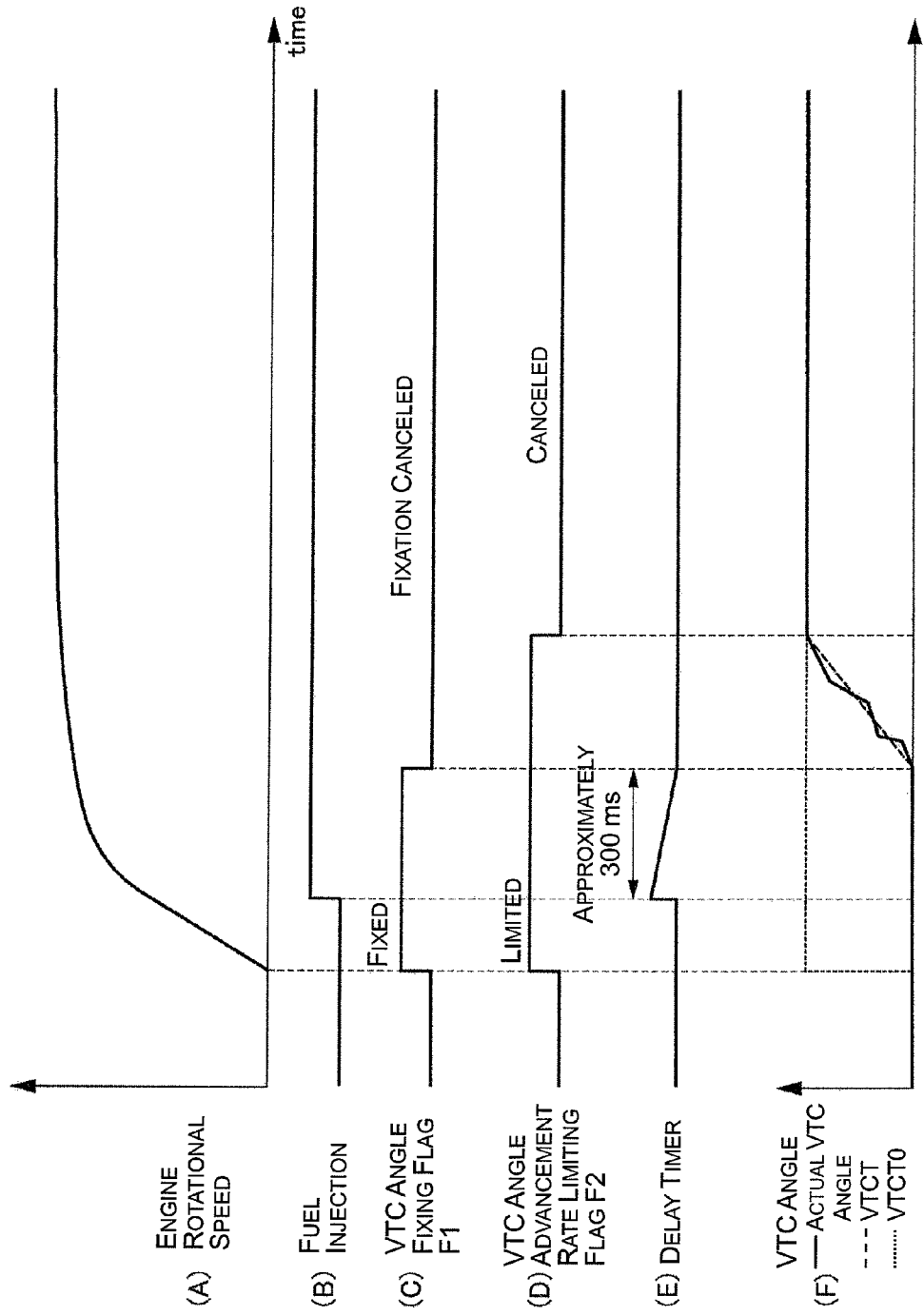
FIG. 10 is a time chart illustrating the control executed by the engine intake valve control apparatus under normal temperature conditions in accordance with the illustrated embodiment of the present invention.

FIG. 10 is a time chart illustrating changes in the rotational speed (diagram (A)), the fuel injection state (diagram (B)), the VTC angle fixing flag F1 (diagram (C)), the VTC angle advancement rate limiting flag F2 (diagram (D)), the delay timer (diagram (E)) and the VTC angle (diagram (F)) according to the control executed by the controller 70 under normal engine coolant temperature conditions. In order to relate the stages of the time chart town in FIG. 10 of the flowcharts shown in FIGS. 5-7, 8A and 8B, step numbers used in the flowcharts will be included in the following explanation.

At the time $t_{11}$, the engine 1 is started as shown in the diagram (A) of FIG. 10 and the target VTC angle VTCT0 is set as shown by the short dotted line in the diagram (F) of FIG. 10 (Yes in step S1). The controller 70 is configured to compare the target VTC angle VTCT0 to the current VTC angle VTCTR (step S22) and to set the VTC angle fixing flag F1 and the VTC angle advancement rate limiting flag F2 at time $t_{11}$ as shown in the diagrams (C) and (D) of FIG. 10 (step S23). Then, the control sequence of steps S1→S3→S4→S41→S42 is repeated until the engine rotational speed reaches the prescribed speed in step S41 (FIG. 7).

At time $t_{12}$, the engine rotational speed reaches the prescribed speed as shown in the diagram (A) of FIG. 10 and fuel injection starts as shown in the diagram (B) of FIG. 10 (Yes in steps S43 and S44). The controller 70 is then configured to set the delay timer T1 as shown in the diagram (E) of FIG. 10 (step S45). In this example under the normal engine coolant temperature condition, the value of the delay timer T1 is set to be a relatively small amount (e.g., approximately 300 milliseconds) based on the engine coolant temperature Tw by referring to the characteristic map such as one shown in the diagram (a) of FIG. 9. Then, the control sequence of steps S1→S3→S4→S41→S43→S46→S47 are repeated until the value of the delay timer T1 reaches 0 (T1=0) in step S47 (FIG. 7).

At time $t_{13}$, the delay timer T1 reaches 0 as shown in the diagram (E) of FIG. 10, (Yes in step S47) and the controller 70 is configured to set the value of the VTC angle fixing flag F1 to 0 to cancel the fixed state of the VTC angle as shown in the diagram (C) of FIG. 10 (step S48). In the next control cycle, the controller 70 proceeds through the control sequence of steps S1→S3→S5→S6→S61→S62 and sets the VTC control angle VTCT. Then, the increase amount of the VTC control angle VTCT (i.e., the VTC angle advancement amount) is limited by the VTC angle advancement rate limit TVTCRL1 that is determined based on the engine coolant temperature Tw by referring to the characteristic map such as one shown in the diagram (b) of FIG. 9. In this example under the normal engine coolant temperature conditions, the VTC angle advancement rate limit TVTCRL1 is set to be a relatively large value as shown in the diagram (b) of FIG. 9. The controller 70 then repeats the control sequence of steps S1→S3→S5→S6→S61→S62→S63 to increase the VTC control angle VTCT until the VTC control angle VTCT exceeds the target VTC angle VTCT0 in step S63 (FIG. 8A). The VTC control angle VTCT gradually increases, and thus, the actual VTC angle VTCTR increases as shown by the solid line in the diagram (F) of FIG. 10.

At time $t_{14}$, the VTC control angle VTCT exceeds the target VTC angle VTCT0 and the controller 70 is configured to set the value of the VTC angle advancement rate limiting flag F2 to 0 to cancel the VTC angle advancement rate limitation as shown in the diagram (D) of FIG. 10 (step S64).

Figure 11:
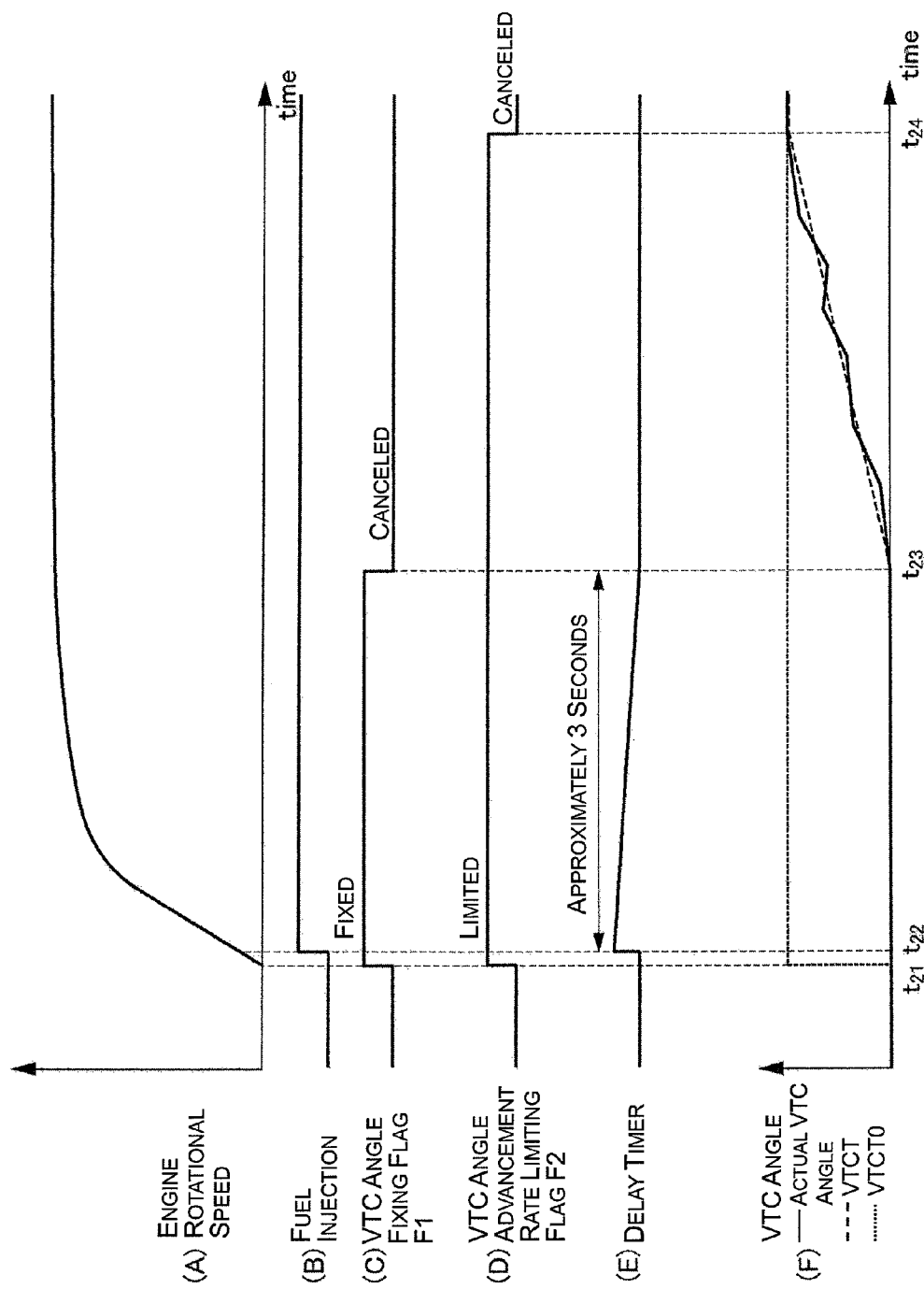
FIG. 11 is a time chart illustrating the control executed by the engine intake valve under very low temperature conditions in accordance with the illustrated embodiment of the present invention.

FIG. 11 is a time chart illustrating changes in the rotational speed (diagram (A)), the fuel injection state (diagram (B)), the VTC angle fixing flag F1 (diagram (C)), the VTC angle advancement rate limiting flag F2 (diagram (D)), the delay timer (diagram (E)) and the VTC angle (diagram (F)) according to the control executed by the controller 70 under very low engine coolant temperature conditions.

At time $t_{21}$, the engine 1 is started as shown in the diagram (A) of FIG. 11. When the target VTC angle VTCT0 is set as shown by the short dotted line in the diagram (F) of FIG. 11 (Yes in step S1), the controller 70 is configured to compare the target VTC angle VTCT0 to the current VTC angle VTCTR (step S22) and to set the VTC angle fixing flag F1 and the VTC angle advancement rate limiting flag F2 as shown in the diagrams (C) and (D) of FIG. 11 (step S23). Until the engine rotational speed reaches the prescribed speed in step S41 (FIG. 7), the control sequence of steps S1→S3→S4→S41→S42 is repeated.

At time $t_{22}$, the engine rotational speed reaches the prescribed speed as shown in the diagram (A) of FIG. 11 and fuel injection starts as shown in the diagram (B) of FIG. 11 (Yes in steps S43 and S44). The controller 70 is then configured to set the delay timer T1 as shown in the diagram (E) of FIG. 11 (step S45). The delay timer T1 is set to a longer time than in the example shown in FIG. 10 (normal temperature conditions). More specifically, in this example under the very low engine coolant temperature condition, the value of the delay timer T1 is set to be a relatively large amount (e.g., approximately 3 seconds) based on the engine coolant temperature Tw by referring to the characteristic map such as one shown in the diagram (a) of FIG. 9. Then, the control sequence of steps S1→S3→S4→S41→S43→S46→S47 is repeated until the value of the delay timer T1 reaches 0 (T1=0).

At time $t_{23}$, the delay timer T1 reaches 0 as shown in diagram (E) of FIG. 11 (Yes in step S47) and the controller 70 is configured to set the value of the VTC angle fixing flag F1 to 0 to cancel the fixed state of the VTC angle as shown in the diagram (C) of FIG. 11 (step S48). In the next control cycle, the controller 70 proceeds through the control sequence of steps S1→S3→S5→S6→S61→S62 and sets the VTC control angle VTCT. Then, the increase amount of the VTC control angle VTCT (i.e., the VTC angle advancement amount) is limited by the VTC angle advancement rate limit TVTCRL1 that is determined based on the engine coolant temperature Tw by referring to the characteristic map such as one shown in the diagram (b) of FIG. 9. In this example under the very low engine coolant temperature conditions, the VTC angle advancement rate limit TVTCRL1 is set to be a relatively small value as shown in the diagram (b) of FIG. 9. The controller 70 then repeats the control sequence of steps S1→S3→S5→S6→S61→S62→S63 to increase the VTC control angle VTCT until the VTC control angle VTCT exceeds the target VTC angle VTCT0 in step S63 (FIG. 8A). The VTC control angle VTCT gradually increases, and thus, the actual VTC angle VTCTR increases as shown in the diagram (F) of FIG. 11. Since the VTC angle advancement rate limit TVTCRL1 is set to be a smaller value in this example under the very low engine coolant temperature condition, the VTC control angle VTCT increases more slowly than in the case of FIG. 10 (normal temperature conditions).

At time $t_{24}$, the VTC control angle VTCT exceeds the target VTC angle VTCT0 and the controller 70 is configured to set the value of the VTC angle advancement rate limiting flag F2 to 0 to cancel the VTC angle advancement rate limitation as shown in the diagram (D) of FIG. 11 (step S64).

Although examples when the VTC angle is advanced are explained in the time charts shown in FIGS. 10 and 11, the control for retarding the VTC angle can be performed in a similar manner according to the flowchart shown in FIG. 8B.

Accordingly, in the illustrated embodiment of the present invention, the VTC angle (target VTC angle VTCT0) is changed slowly when the engine coolant temperature Tw is very low. More specifically, changing the VTC angle has a large effect on the air fuel ratio (i.e., the air fuel ratio changes by a large amount in response to a change in the VTC angle) when fuel adhered to the intake port 22 does not vaporize readily. Additionally, when the target VTC angle VTCT0 that is much larger than the current VTC angle is newly set while conditions are such that adhered fuel does not vaporize readily, the air fuel ratio of the air fuel mixture drawn into the cylinder 11 will change greatly and the combustion will become unstable if the VTC angle is changed to the target VTC angle VTCT0 abruptly. In particular, if such a situation occurs during engine starting, it may not be possible to start the engine 1. Therefore, the illustrated embodiment of the present invention is configured to change the VTC angle slowly under such conditions. By changing the VTC angle slowly, the air fuel ratio can be prevented from changing abruptly and the combustion conducted by the engine 1 can be stabilized. The lower the engine coolant temperature Tw is, the more difficult it is for fuel adhered to the intake port to vaporize. Consequently, when VTC angle change control is started while the coolant temperature is low, a small change in the VTC angle can easily cause a large change in the air fuel ratio. Therefore, the present invention is configured such that when the engine coolant temperature Tw is low, a longer period of time (delay time T1) is inserted between the start of fuel injection and the start of VTC angle change control, and the VTC angle is changed more slowly.

The present invention is not limited to the embodiment described heretofore. Numerous variations and modification can clearly be made without departing from the scope of the technical idea of the invention. For example, although the illustrated embodiment presents an example in which the valve open timing control mechanism is a VTC mechanism 40 comprising the intake valve camshaft 41 and the cam sprocket 42, the present invention is not limited to such a mechanism. For example, the valve open timing mechanism can be a variable valve control mechanism configured to change the open/close timing and the valve open duration (operating angle) of a valve simultaneously using a multi-jointed link (as explained, for example, in Japanese Laid-Open Patent Publication No. 11-107725), a solenoid valve configured to change the open and close timings of the valve using an electromagnetic coil (as explained, for example, in Japanese Laid-Open Patent Publication No. 2000-45733), or any other mechanism capable of changing the valve open timing.

Accordingly, with the illustrated embodiment of the present invention, the change rate at which the open timing of the intake valve 15 (the VTC angle) is changed from the current open timing (the current VTC angle VTCTR) to the target open timing (the target VTC angle VTCT0) is set in accordance with the degree of ease with which fuel adhered to the intake port 22 vaporizes (i.e., a rate at which the fuel adhered to the intake port 22 vaporizes). As a result, when the open timing of the intake valve 15 is changed, abrupt changes in the air fuel ratio can be prevented and the combustion conducted by the engine 1 can be stabilized.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiment according to the present invention are provided for illustration only, and not for the purpose of limiting the invention as defined by the appended claims and their equivalents.

What is claimed is:

1. An engine intake valve timing control apparatus comprising:
   a fuel injection control section configured to control a fuel injection quantity of fuel injected from a fuel injector into an intake port of an engine in accordance with an operating condition of the engine;
   a valve open timing control section configured to control an open timing of an intake valve to a target open timing; and
   a valve timing change rate setting section that sets a change rate at which the open timing of the intake valve is changed from a current open timing to the target open timing when the target open timing is updated, the change rate being set using a parameter relating to a vaporization rate of the fuel adhered to the intake port when the target open timing advances from a retarded open timing in which the intake valve opens after an exhaust valve closes in a vicinity of top dead center.

2. The engine intake valve timing control apparatus as recited in claim 1, wherein
   the valve timing change rate setting section is further configured to limit the change rate by setting a delay time required to elapse before the open timing of the intake valve starts to change.

3. The engine intake valve timing control apparatus as recited in claim 2, wherein
   the valve timing change rate setting section is configured to set the delay time such that as a coolant temperature of the engine becomes lower, the delay time becomes longer.

4. The engine intake valve timing control apparatus as recited in claim 1, wherein
   the valve timing change rate setting section is configured to limit the change rate by setting a change rate limit value used to change the open timing from when the open timing starts to change to when the target open timing is reached.

5. The engine intake valve timing control apparatus as recited in claim 4, wherein
   the valve timing change rate setting section is configured to set the change rate limit value such that as a coolant temperature of the engine becomes lower, the change rate limit value becomes smaller.

6. An engine intake valve timing control apparatus comprising:
- a fuel injection control section configured to control a fuel injection quantity of fuel injected from a fuel injector into an intake port of an engine in accordance with an operating condition of the engine;
- a valve open timing control section configured to control an open timing of an intake valve to a target open timing; and
- a valve timing change rate setting section that sets a change rate at which the open timing of the intake valve is changed from a current open timing to the target open timing when the target open timing is updated, the change rate being set using a parameter relating to a vaporization rate of the fuel adhered to the intake port, with the valve timing change rate setting section being configured to limit the change rate when a difference between the target open timing and the current open timing of the intake valve is larger than a prescribed value.

7. An engine system comprising:
- an intake port arranged to fluidly communicate with a combustion chamber of an engine;
- an intake valve configured and arranged to selectively open and close a communication between the intake port and the combustion chamber;
- a variable valve timing mechanism configured and arranged to adjust an open timing of the intake valve to a target open timing;
- a fuel injector arranged in the intake port to inject fuel; and
- a controller configured to control a fuel injection amount of the fuel injected from the fuel injector and to control the variable valve timing mechanism to change the open timing of the intake valve to the target open timing in accordance with an operating condition of the engine, the controller being further configured to adjust a change rate at which the open timing of the intake valve is changed using a parameter relating to a vaporization rate of the fuel adhered to the intake port when the target open timing advances from a retarded open timing in which the intake valve opens after an exhaust valve closes in a vicinity of top dead center.

8. The engine system as recited in claim 7, wherein the controller is further configured to limit the change rate by setting a delay time required to elapse before the open timing of the intake valve starts to change.

9. The engine system as recited in claim 8, wherein the controller is configured to set the delay time such that as a coolant temperature of the engine becomes lower, the delay time becomes longer.

10. The engine system as recited in claim 7, wherein the controller is configured to limit the change rate by setting a change rate limit value used to change the open timing from when the open timing starts to change to when the target open timing is reached.

11. The engine system as recited in claim 10, wherein the controller is configured to set the change rate limit value such that a coolant temperature of the engine becomes lower, the change rate limit value becomes smaller.

12. An engine system comprising:
- an intake port arranged to fluidly communicate with a combustion chamber of an engine;
- an intake valve configured and arranged to selectively open and close a communication between the intake port and the combustion chamber;
- a variable valve timing mechanism configured and arranged to adjust an open timing of the intake valve;
- a fuel injector arranged in the intake port to inject fuel; and
- a controller configured to control a fuel injection amount of the fuel injected from the fuel injector and to control the variable valve timing mechanism to change the open timing of the intake valve in accordance with an operating condition of the engine, the controller being further configured to adjust a change rate at which the open timing of the intake valve is changed using a parameter relating to a vaporization rate of the fuel adhered to the intake port,
- the controller being configured to limit the change rate when a difference between a target open timing and a current open timing of the intake valve is larger than a prescribed value.

13. An engine intake valve timing control method comprising:
- controlling a fuel injection quantity of fuel injected from a fuel injector into an intake port of an engine in accordance with an operating condition of the engine;
- controlling an open timing of an intake valve to a target open timing; and
- setting a change rate by which the open timing of the intake valve is changed from a current open timing to the target open timing when the target open timing is updated using a parameter relating to a vaporization rate of the fuel adhered to the intake port when the target open timing advances from a retarded open timing in which the intake valve opens after an exhaust valve closes in a vicinity of top dead center.

* * * * *